United States Patent [19]
Olmstead et al.

[11] Patent Number: 4,501,995
[45] Date of Patent: Feb. 26, 1985

[54] AUTOMATIC "S" CORRECTION CIRCUIT

[75] Inventors: Harold W. Olmstead, Hillsboro; Gary D. Andrews, Portland, both of Oreg.; Clayton C. Walquist, West Valley City, Utah

[73] Assignee: Tektronix, Inc., Beaverton, Oreg.

[21] Appl. No.: 366,011

[22] Filed: Apr. 6, 1982

[51] Int. Cl.³ .......................................... H01J 29/56
[52] U.S. Cl. ................................................. 315/371
[58] Field of Search ................ 315/370, 371, 408, 387

[56] References Cited
U.S. PATENT DOCUMENTS
4,176,303 11/1979 Babcock et al. .................... 315/371

Primary Examiner—Theodore M. Blum
Assistant Examiner—Gregory Issing
Attorney, Agent, or Firm—John Smith-Hill

[57] ABSTRACT

An automatic S correction circuit for a resonant scan deflection circuit comprises a plurality of S-shaping capacitors. The peak voltage and the peak-to-peak voltage across the S capacitors are detected, and the number of effective capacitors is varied to maintain the peak voltage and the peak-to-peak voltage in a predetermined relationship.

5 Claims, 3 Drawing Figures

AUTOMATIC "S" CORRECTION CIRCUIT

BACKGROUND OF THE INVENTION

1. Field of the Invention

This invention pertains to an automatic 'S' correction circuit for use with a resonant scan deflection circuit.

2. Description of the Prior Art

Large, relatively flat screen display devices, such as cathode-ray tubes (CRTs) utilize electromagnetic deflection circuits and deflection yokes for deflecting the electron beam being emitted from the electron gun before the beam reaches and bombards the phosphor screen. A relatively linear ramp or sawtooth signal current could be made to flow in the deflection coil for deflecting the electron beam. However, if this linear, sawtooth signal current does flow in the deflection coil of a conventional CRT, the amount of each incremental deflection of the electron beam as measured on the face, plate per each increment of the deflection coil current increases with respect to the angle of the beam to the tube axis. This results from the fact that the center of deflection of the electron beam does not coincide with the center of curvature of the faceplate. The deviation from linear relationship between current and beam position increases towards the periphery of the faceplate. This phenomenon is more significant in wide deflection angle, short cathode-ray tubes.

In order to prevent the above-mentioned disadvantage from occurring, a relatively non-linear sawtooth deflection signal current is generated and flows in the deflection coil. As a result, the amount of each incremental deflection of the electron beam as measured on the screen or faceplate per each increment of deflection coil current remains approximately constant. FIG. 1 illustrates the non-linear sawtooth deflection signal current $i_D$ which must flow in the deflection coil in order to maintain a constant relationship between increases in the deflection of the electron beam and increases in deflection coil current. Note that portion A of the deflection waveform shown in FIG. 1 is roughly part of a sine wave and therefore satisfies the relationship $$i_D = I \sin \omega t \qquad (1)$$

where I is a constant based on the peak deflection current and $\omega$ is the angular frequency of the sine wave. The circuit for providing the required nonlinear waveform is known as an S-shaping circuit, wherein an S-shaping capacitor is connected in series with the deflection coil, for example as disclosed in U.S. Pat. No. 4,241,296. The capacitance of the S-shaping capacitor is carefully chosen, dependent upon the inductance of the deflection coil and the scan rate, in order to provide the optimum deflection current waveform for a particular application. However, there is a distinct disadvantage with respect to the use of such known deflection circuits in television monitors or graphic display units in which the capability of operating at different or continuously variable scan rates is desired, since the optimum S-shaping capacitance must be varied as the scan rate is changed.

According to the present invention there is provided an automatic 'S' correction circuit for use with a resonant scan deflection circuit including deflection coil means, said correction circuit comprising:

S-shaping capacitor means having a terminal for connection to the deflection coil means, said capacitor means being of selectively variable effective capacitance;

detector means connected to said S-shaping capacitor means for detecting the peak voltage and the peak-to-peak voltage across the capacitor means; and control means connected to the detector means and the S-shaping capacitor means and responsive to the detected values of said peak voltage and said peak-to-peak voltage to vary the effective capacitance of the capacitor means to maintain said peak voltage and said peak-to-peak voltage in a predetermined relationship.

In a preferred embodiment of the invention the effective capacitance of the S-shaping capacitor means is changed in order to maintain the ratio of the peak voltage to the peak-to-peak voltage within a relatively narrow predetermined range of values.

BRIEF DESCRIPTION OF THE DRAWINGS

A full understanding of the present invention will be obtained from the detailed description given hereinbelow and the accompanying drawings which are given by way of illustration only, and thus are not limitative of the present invention, and wherein.

DETAILED DESCRIPTION OF THE INVENTION

Figure 1:
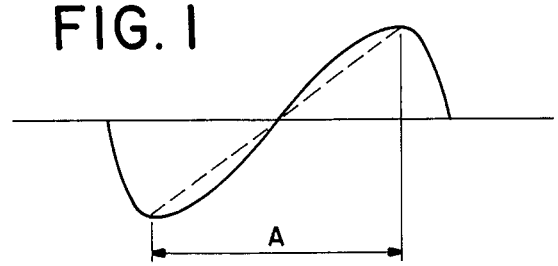
FIG. 1 is a deflection current waveform subsequent to S correction.
Figure 2:
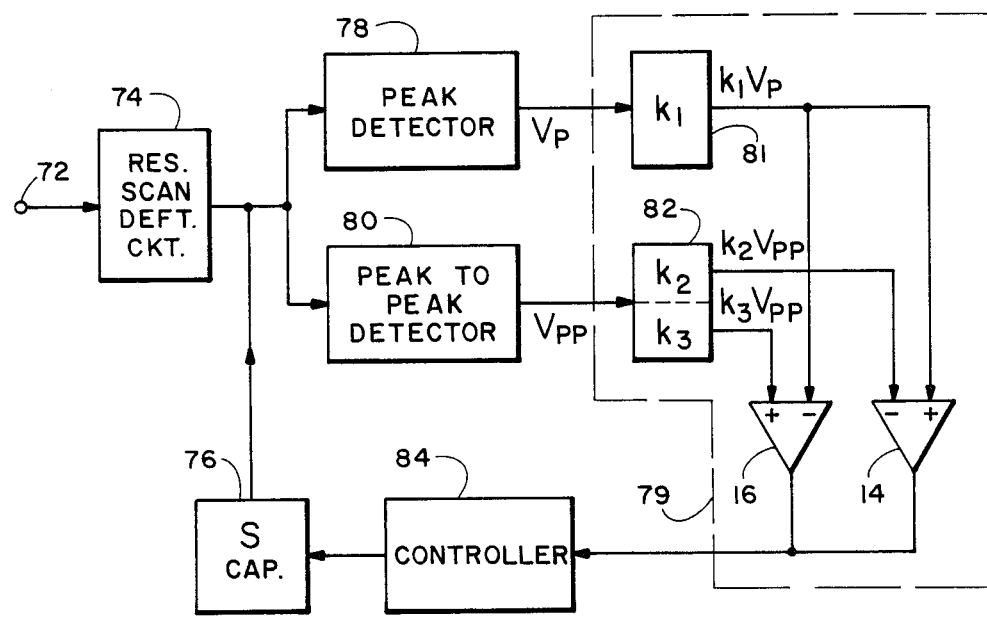
FIG. 2 is a block diagram of an automatic S correction circuit embodying the present invention.

FIG. 2 is a block diagram of one preferred embodiment of the automatic S correction circuit according to this invention. A sync pulse applied to input terminal 72 is coupled to resonant scan deflection circuit 74, which may be of conventional design such as disclosed in U.S. Pat. No. 4,241,296. Connected in series with the deflection coil in deflection circuit 74 is S capacitance circuit 76. It is preferred that the S capacitance circuit 76 comprises a plurality of capacitors of different capacitance connected to a switching matrix, but it may alternatively, be an effective capacitance which is electrically variable. The switching matrix (not shown in FIG. 2) may comprise electronic or electromechanical switches such as bipolar transistors, FETs or relays, which are capable of switching any of the plurality of capacitors in or out of the circuit. The S capacitance circuit 76 is connected to a peak detector 78 and a peak-to-peak detector 80 for detecting the peak and peak-to-peak voltages (Vp and Vpp) across the effective capacitor(s) of the S capacitance circuit 76, respectively. The peak voltage is applied to divider 81 and the peak-to-peak voltage is applied to divider 82. The output signals from the voltage divider 82 ($k_2$Vpp and $k_3$Vpp) are compared to the attenuated peak voltage ($k_1$Vp) from voltage divider 81 via comparators 14 and 16. If $k_1$Vp falls outside of the range $k_3$Vpp < $k_1$Vp < $k_2$Vpp (i.e., Vp/Vpp has significantly departed from the desired constant value), control signals are applied to controller 84 for altering the switching matrix in the S capacitance circuit 76. The switching matrix in the S capacitance circuit 76 is controlled such that the ratio Vp/Vpp remains at a substantially constant, desired value.

As is understood from the foregoing description of FIG. 2, the automatic S correction and control circuit is a closed loop circuit which uses the voltage appearing on the effective S-shaping capacitor(s) to vary the S-shaping capacitance in order that the ratio Vp/Vpp remains substantially constant. A unique algorithm is utilized to determine the proper amount of S correction capacitance to produce a linear display on the screen, the linear display being produced when the amount of each incremental deflection of the electron beam per each increment of deflection coil current remains approximately constant. If the proper S capacitance is not present, the value Vp/Vpp will deviate from its desired, constant value. As a result, control circuit 79 will provide controller circuit 84 with a signal which will cause the controller via the switching matrix to increase or decrease the 'S' capacitance according to the algorithm. When the proper capacitance is achieved, the ratio Vp/Vpp is returned to its desired, constant value, the loop is satisfied, and controller 84 stops changing the S capacitance. The algorithm for determining the correct capacitance is based on the fact that the proper S capacitance is achieved by maintaining the ratio of Vp/Vpp constant as the scan rate is varied. The justification for keeping this ratio a constant is as follows:

The deflection current $i_D$ in deflection coil 35 is given by equation (1) above. In addition, $$\omega \approx \frac{1}{\sqrt{LC}}$$

where L is the yoke inductance and C is the capacitance of the S capacitor.

The voltage on the S capacitor is found by:

$$V = \frac{I}{C} \int \sin\omega t \, dt = \frac{I}{\omega C} \cos\omega t = I\sqrt{\frac{L}{C}} \cos\omega t \quad (2)$$

The peak voltage Vp on S capacitance occurs at $t=0$ and the minimum voltage $V_M$ occurs at $t=t_{max}$.
Therefore, $$Vp = I\sqrt{\frac{L}{C}} \quad (3)$$

$$Vpp = Vp - V_M = I\sqrt{\frac{L}{C}} - I\sqrt{\frac{L}{C}} \cos\omega t_{max}$$

The ratio Vp/Vpp is given by the following equation:

$$\frac{Vp}{Vpp} = \frac{I\sqrt{\frac{L}{C}}}{I\sqrt{\frac{L}{C}} - I\sqrt{\frac{L}{C}} \cos\omega t_{max}} = \frac{1}{1 - \cos\omega t_{max}}$$

It can be shown that for a given tube and yoke combination, $\omega t_{max}$ is a constant based on the size of the displacement of the beam across the face of the CRT and not based on the scan rate of the beam. Hence, it is desirable for $\omega t_{max}$ to remain constant as the scan rate changes. It can be seen that a constant $\omega t_{max}$ implies that Vp/Vpp should be constant. Note also that $$\omega t_{max} = \frac{t_{max}}{\sqrt{LC}} \quad (5)$$

Since L is the deflection yoke inductance and it is a constant, $t_{max} \propto \sqrt{C}$ so $C \propto t^2_{max}$, i.e., if $t_{max}$ increases by a factor of 2, then C must increase by a factor of 4.

Figure 3:
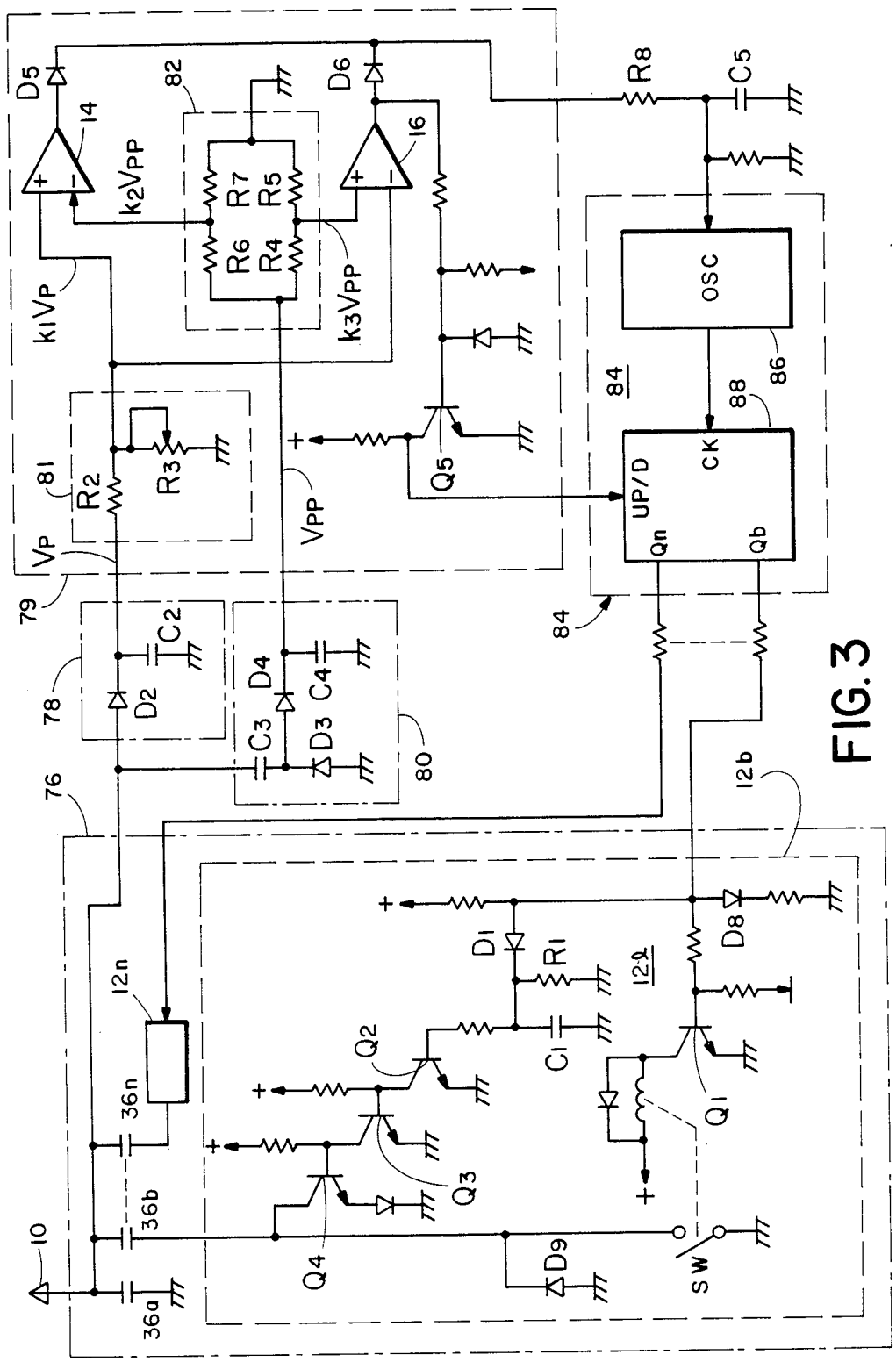
FIG. 3 is a detailed circuit schematic of the automatic S correction circuit shown in FIG. 2.

FIG. 3 illustrates a detailed circuit schematic of the automatic S correction circuit shown in block form in FIG. 2 of the drawings. S capacitance circuit 76 includes a plurality of S correction capacitors 36a, 36b, . . . , 36n each having one terminal connected via lead wire 10 to resonant scan deflection circuit 74 including the deflection coil 35. The other terminal of capacitor 36a is directly grounded while those of the capacitors 36b, 36c, . . . 36n are connected to programmable switches 12b, 12c, . . . , 12n. The circuit components of each switch 12b, 12c, . . . 12n may be identical, and accordingly in FIG. 3 the circuit schematic of only switch 12b is shown.

Switch 12b has a control terminal which is connected to an output terminal Qb of an up/down counter 88. The control terminal of switch 12b is connected to the anode of a diode $D_1$ which has its cathode terminal connected to one end of a resistor $R_1$. The opposite end of resistor $R_1$ is grounded. A capacitor $C_1$ is connected in parallel with resistor $R_1$. The parallel combination of capacitor $C_1$ and resistor $R_1$ is connected to the base of a transistor Q2 via a resistor. The emitter of transistor Q2 is grounded. The collector of transistor Q2 is connected to the base of another transistor Q3. The collector of transistor Q2 is also connected to a voltage supply via a resistor. The emitter of transistor Q3 is grounded, and the collector of transistor Q3 is connected to the base of a further transistor Q4. The collector of transistor Q3 is also connected to a voltage supply via a resistor. The emitter of transistor Q4 is connected to the anode terminal of a diode, the cathode terminal of which is grounded. The collector of transistor Q4 is connected to the S-shaping capacitor 36b. The collector of transistor Q4 is further connected to the switch SW, the other terminal of the switch SW being grounded. A diode D9 is connected in parallel with the switch SW. The control terminal of switch 12b is also connected to a light-emitting diode D8, which is connected to ground via a resistor. The control terminal of the switch 12b is also connected to the base of transistor Q1. The base of transistor Q1 is also connected to a pull-down resistor. The emitter of transistor Q1 is grounded. The collector of transistor Q1 is connected to a positive voltage supply via a relay coil which controls switch SW. The relay is shunted by a diode such that the anode terminal of the diode is connected to the collector of transistor Q1. When Q1 is turned on, the relay is energized by the current from the voltage supply and switch SW will close. The diode which shunts the relay coil prevents the transistor Q1 from being harmed by an excessive flyback voltage pulse which would occur when the transistor Q1 switches to an off condition.

The voltage developed across S correction capacitors 36 is supplied to peak detector 78 which comprises a diode D2 and a capacitor C2. The voltage developed across the S correction capacitors 36 is also supplied to peak-to-peak detector 80 which comprises capacitors C3 and C4 and diodes D3 and D4. The peak detector 78 develops the peak voltage Vp and the peak-to-peak detector 80 develops the peak-to-peak voltage Vpp at their respective outputs. Vp is applied to the non-inverting and the inverting input terminals of operational amplifiers 14 and 16, respectively, via a variable divider 81 consisting of resistors $R_2$ and $R_3$ having a dividing ratio $k_1$. Vpp is applied to the inverting and non-inverting input terminals of operational amplifiers 14 and 16, respectively, through divider 82 consisting of resistors $R_6$ and $R_7$, and resistors $R_4$ and $R_5$ having dividing ratio $k_2$ and $k_3$, respectively. The output signals from these operational amplifiers 14 and 16, which operate as voltage comparators, are supplied through diodes $D_5$, $D_6$ to controllable oscillator 86 via a resistor and capacitor network. The output from the operational amplifier 16 is also applied to the base of transistor $Q_5$ via a resistor and diode network. The output from oscillator 86 and the collector output of transistor $Q_5$ are respectively applied to the clock terminal CK and up/down control terminal UP/D of up/down counter 88. The outputs $Q_b, \ldots Q_n$ from up/down counter 88 are applied, respectively, to the control terminals of electronic switches $12b, \ldots 12n$.

In operation, deflection currents will flow through S correction capacitors 36 as mentioned hereinbefore and the corresponding peak voltage Vp and peak-to-peak voltage Vpp are provided at the outputs of detectors 78 and 80, respectively. Variable divider 81 is used to choose the voltage $k_1$Vp. Divider 82 provides the voltages $k_2$Vpp and $k_3$Vpp. Operational amplifier 14 provides a positive output when $k_1 Vp > k_2 Vpp$ and operational amplifier 16 provides a positive output when $k_1 Vp < k_3 Vpp$. Therefore, operational amplifiers 14 and 16 provide no positive output in the range of $k_3 Vpp < k_1 Vp < k_2 Vpp$. Oscillator 86 oscillates at a certain low frequency (approximately 1 Hz) when either one of amplifiers 14 or 16 provides a positive output to clock the up/down counter 88. The counting direction of up/down counter 88 depends on the signal at the UP/D terminal thereof, which originates from amplifier 16. As the up/down counter 88 counts up, in response to the signal at the UP/D terminal, more of the capacitors $36b, 36c, \ldots 36n$ will be included as part of the 'S' capacitance. As the counter 88 counts down, in response to an opposite-polarity signal at the UP/D terminal, fewer of the capacitors $36b, 36c, \ldots, 36n$ will be included as part of the 'S' capacitance. The S capacitance is established within the range corresponding to $k_3 Vpp < k_1 Vp < k_2 Vpp$, and the circuit maintains this condition even when the scanning rate changes.

If the outputs, for example, $Q_b$, of up/down counter 88 are high, transistors $Q_1$ and $Q_2$ are conducting and transistor $Q_3$ is non-conducting. In this condition, relay SW and electronic switch transistor $Q_4$ turn on to thereby include capacitor $36b$ as part of the 'S' capacitance. However, when the output $Q_b$ goes low, relay SW and transistor $Q_4$ turn off to isolate capacitor $36b$ from the circuit. Diode $D_1$ will be turned off in this condition, but electronic switching transistor $Q_4$ will remain on for a certain time predetermined by the time constant of capacitor $C_1$ and resistor $R_1$. This ensures that the relay switch SW will switch first thereby reducing arcing inside the relay.

The switches $12b, \ldots, 12n$ are identical to one another and operate in a similar manner on receiving the output $Q_b, \ldots Q_n$ from up/down counter 88. S correction operation will be accomplished to maintain the peak and peak-to-peak voltages across the effective capacitors 36 in the relationship $k_3 Vpp < k_1 Vp < k_2 Vpp$. The number of S correction capacitors 36 and the capacitance of each may be chosen arbitrarily depending on the required accuracy.

As will be understood from the foregoing description, the automatic S correction circuit provides the proper amount of S correction capacitance automatically by sensing the peak and the peak-to-peak voltages on the effective S capacitor(S) and adjusting the capacitance until the ratio Vp/Vpp returns to the desired value. The circuit is very simple and inexpensive.

The invention is not restricted to the circuit which has been described, since it will be apparent to persons skilled in the art that variations may be made without departing from the scope of the invention as defined in the following claims. For example, instead of employing two dividers for developing the signals k, Vp, $k_2$Vpp and $k_3$Vpp, and comparing k, Vp separately with $k_2$Vpp and $k_3$Vpp, a single divider could be employed to form directly a signal representative of the ratio Vp/Vpp and this signal used to activate the oscillator 86 in the event that the value of the ratio lies outside a predetermined range.

We claim:

1. An automatic 'S' correction circuit for use with a resonant scan deflection circuit including deflection coil means, said correction circuit comprising:

S-shaping capacitor means having a terminal for connection to the deflection coil means, said capacitor means being of selectively variable effective capacitance;

detector means connected to said S-shaping capacitor means for detecting the peak voltage and the peak-to-peak voltage across the capacitor means; and control means connected to the detector means and the S-shaping capacitor means and responsive to the detected values of said peak voltage and said peak-to-peak voltage to vary the effective capacitance of the capacitor means to maintain said peak voltage and said peak-to-peak voltage in a predetermined relationship.

2. An automatic 'S' correction circuit in accordance with claim 1 wherein said S-shaping capacitor means comprises a plurality of capacitors connected in parallel with one another to said terminal and for connection in series with said deflection coil, and said control means comprise a plurality of switch means connected to said capacitors respectively for selectively either including each capacitor in charging relationship with said deflection coil means or excluding each capacitor from charging relationship with said deflection coil means.

3. An automatic S-correction circuit in accordance with claim 1, wherein said control means operate to maintain the ratio of said peak voltage to said peak-to-peak voltage within a predetermined range of values.

4. An automatic S-correction circuit in accordance with claim 3, wherein said control means comprise a first voltage divider circuit connected to said detector means for generating a first signal which is representative of the product of the peak voltage and a first constant, a second voltage divider circuit connected to said detector means for generating a second signal which is representative of the product of the peak-to-peak voltage and a second constant and a third signal which is representative of the product of the peak-to-peak voltage and a third constant, a first comparator circuit for providing an output signal only if the magnitude of the first signal exceeds the magnitude of the second signal, and a second comparator for providing an output signal only if the magnitude of the third signal exceeds the magnitude of the first signal, whereby the comparator circuits do not provide an output signal if the ratio of the peak voltage to the peak-to-peak voltage falls within a range determined by the values of said constants.

5. An automatic 'S' correction circuit in accordance with claim 4 wherein said S-shaping capacitor means comprise a plurality of capacitors connected in parallel with one another to said terminal and for connection in series with said deflection coil, and said control means comprise a plurality of switch means connected to said capacitors respectively for selectively including each capacitor in charging relationship with said deflection coil means or excluding each capacitor from charging relationship with said deflection coil means and said control means comprise oscillator means connected to the comparator circuits for generating an output signal when an output signal is provided by the comparator circuits, and up/down counter means having a plurality of output terminals connected to said switch means respectively and being responsive to the output signal from said oscillator means for providing an output signal at an increasing or decreasing number of output terminals in response thereto, each said switch means being effective to include the capacitor connected thereto in charging relationship with the deflection coil only in the event that an output signal is provided at the output terminal of the up/down counter means to which said switch means are connected.

\* \* \* \* \*